United States Patent [19]

Pogue

[11] 4,193,219
[45] Mar. 18, 1980

[54] SEA MAMMAL GATE

[76] Inventor: Clarence W. Pogue, 6631 Monlaco Rd., Long Beach, Calif. 90808

[21] Appl. No.: 861,691

[22] Filed: Dec. 19, 1977

[51] Int. Cl.² .............................................. A01K 73/02
[52] U.S. Cl. ........................................ 43/14; 43/106
[58] Field of Search ............... 43/7, 8, 14, 100, 106; 137/223; 251/63, 63.5, 63.6

[56] References Cited

U.S. PATENT DOCUMENTS

| 528,350 | 10/1894 | Trouve | 43/8 |
| 2,549,475 | 4/1951 | Jardim | 43/7 X |
| 3,687,017 | 8/1972 | Lewis | 251/63.6 |
| 3,830,004 | 8/1974 | Poirot | 43/14 |
| 3,849,927 | 11/1974 | Gonsalves | 43/14 |
| 4,006,549 | 2/1977 | Seabrooke | 43/14 |

OTHER PUBLICATIONS

Perrin, W. F., U.S. Department Of Commerce National Marine Fisheries Service, Cruise Report, 9-25-71.

Primary Examiner—Nicholas P. Godici
Attorney, Agent, or Firm—Fulwider, Patton, Rieber, Lee & Utecht

[57] ABSTRACT

A gate is provided in a seine fishing net to allow sea mammals entrapped with fist in the net to escape. The gate is selectively inflated or deflated so that it may be raised to the surface or lowered, and is disposed in position in place of floatation devices at the upper extremity of a section of the net. A ribbon net is connected to one side of the gate and is drawn between schools of sea mammals and entrapped fish to allow the sea mammals to escape through the gate while discouraging the fish from escaping the seine net once the seine net has been set.

7 Claims, 14 Drawing Figures

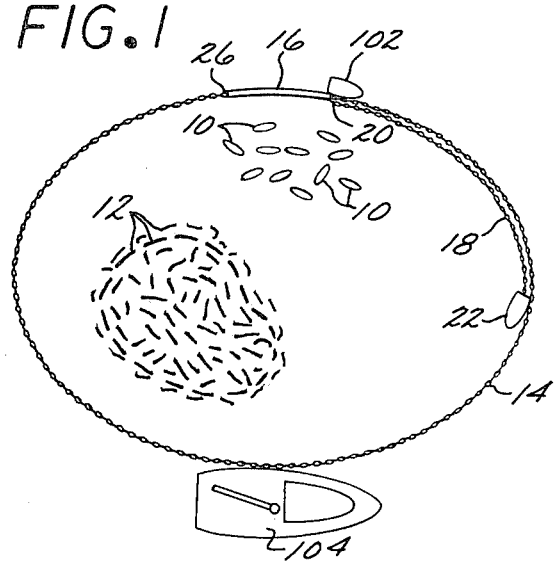
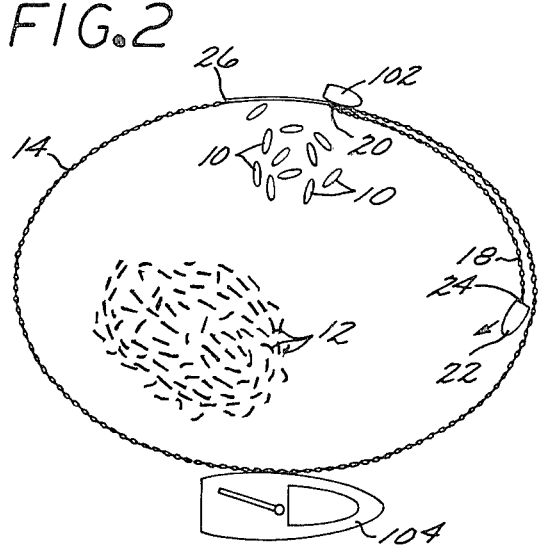
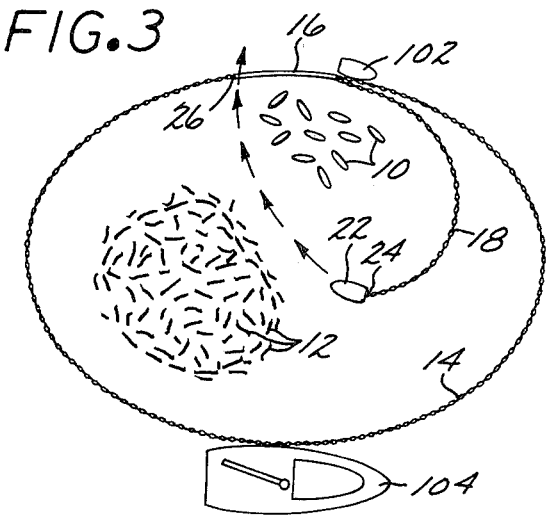
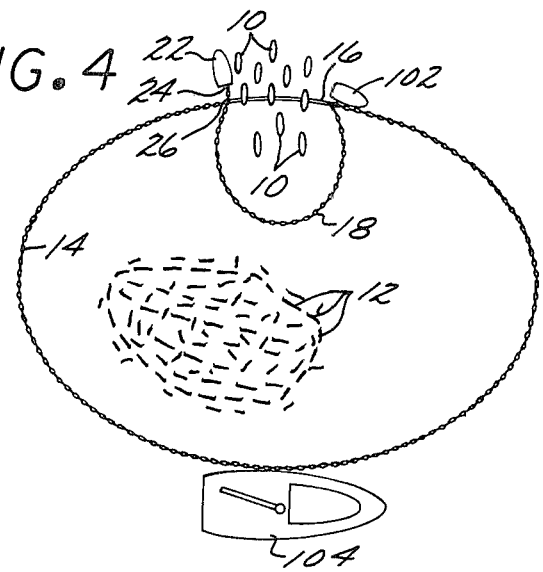
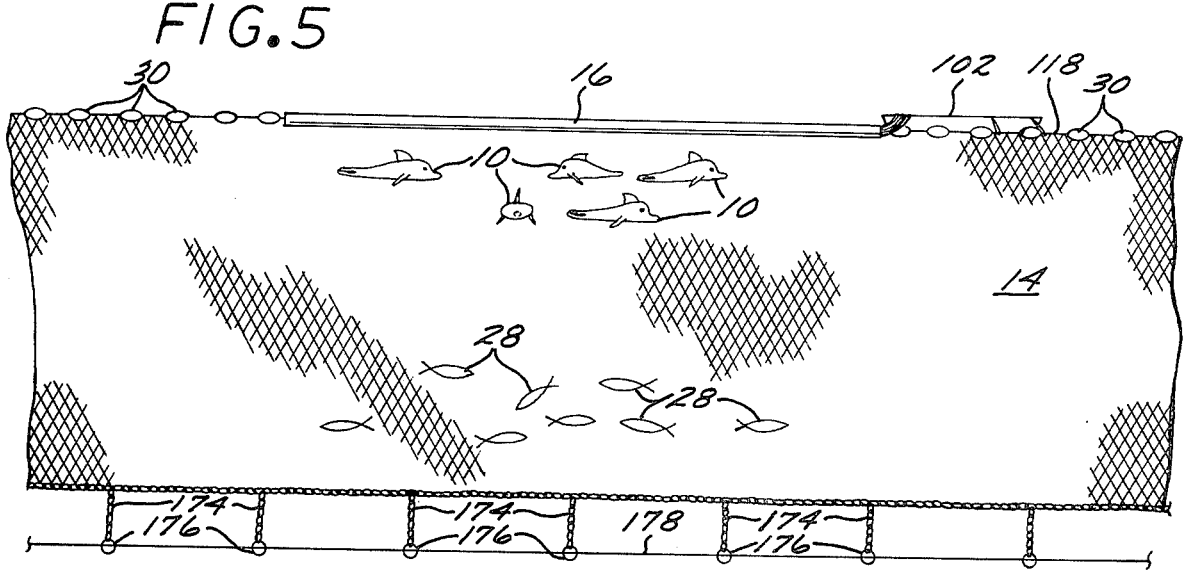

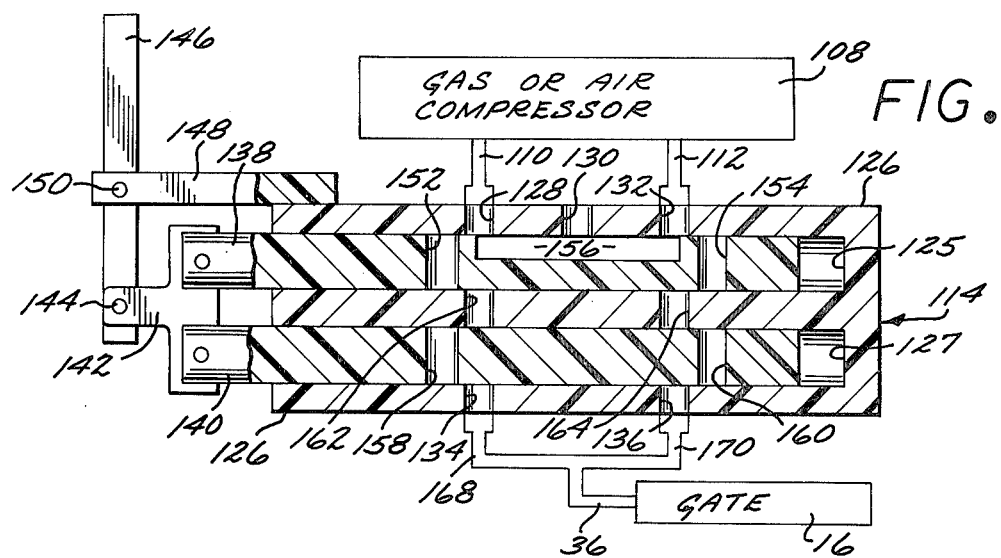
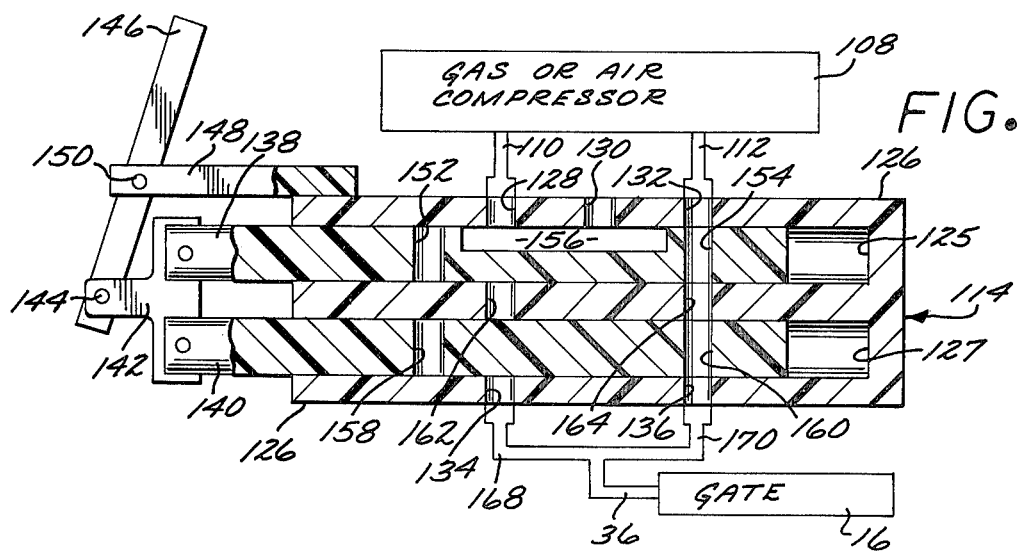
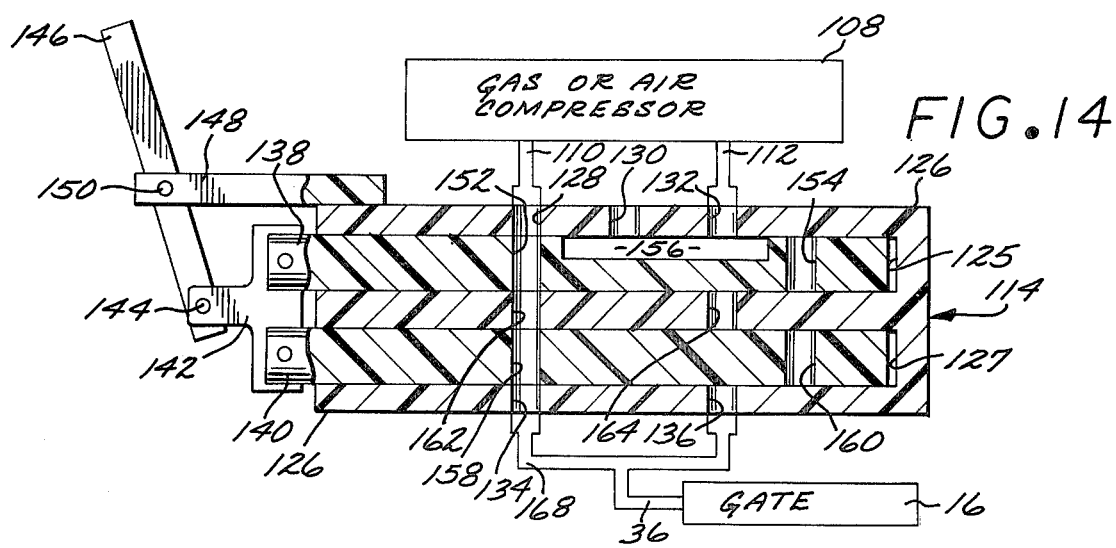

SEA MAMMAL GATE

BACKGROUND OF THE INVENTION

1. Field of the Invention

The present invention relates to techniques and devices for use in commercial fishing.

2. Description of the Prior Art

In recent years, there has an increasing public concern over the number of porpoises which are trapped in seine fishing nets and inadvertently killed in the practice of conventional purse net techniques of commercial fishing. Because porpoises tend to school in the vicinity of yellow fin tuna, a major species in commercial fishing, they are frequently trapped in fishing nets which are set by tuna fishing boats. One technique for locating tuna is to first locate a school of porpoises, since there is a fair likelihood that tuna will be found in the immediate vicinity, frequently in schools beneath the porpoises at greater depths. While commercial fishermen release any porpoises trapped with the fish, many porpoises are killed because their snouts and flukes become entangled in the webbing of the seine nets beneath the surface of the water, and the animals are unable to surface in order to breathe.

Various types of porpoise gates have been deviced for use with seine nets in order to allow porpoises to escape. Such conventional techniques usually allow a portion of the perimeter of an encircling net to the collapsed so that the porpoises are able to swim over the top of the net at the collapsed section. However conventional techniques of this type have been unsatisfactory because the release of porpoises is only accomplished after lengthly delays in collapsing and again erecting the portion of the net across which the porpoises find a pathway to freedom. The delays involved prolong the period of captivity for the porpoises, which sometimes become entangled in the net webbing and drown. Also, the lengthy delays in rasising the net perimeters once they have been lowered frequently allows the tuna, or other entrapped fish to escape along with the porpoises. Furthermore, because collapsing the net is such an arduous process, the porpoises frequently move to an area of the net remote from the collapsed section before lowering of that section has been completed. They then do not find their way to freedom, but remain within the net.

Another technique which has been attempted in order to prevent porpoises from becoming entrapped within seine nets is to broadcast underwater recorded sounds of killer whales or sharks in the area of the porpoises before the seine net has been completely set in order frighten the porpoises away. This has likewise proven inadequate, however, since fish are just as likely to respond to such sounds as are porpoises, and are just as likely to leave the area. Moreover, the delay in closing the perimeter of the net allows the fish to escape, whether or not they respond to the recorded sounds.

SUMMARY OF THE INVENTION

The present invention involves the provision of a porpoise gate for a seine net which can be quickly raised and lowered. This is done by substituting one or more elongated inflatable chambers in place of a section of the line of surface floats which hold the upper perimeter of the seine net at the surface of the ocean. The inflatable chamber can then be filled with a compressed gas, such as air, which causes the chambers to rise to the surface of the water, thereby closing the gate. Alternatively, air can be expelled from the elongated chambers so that the gate can be dropped below the surface of the water and trapped porpoises can swim out over it. The change between buoyancy and submersion by the elongated chambers is performed with an elapse of but a few moments as air is pumped into or exhausted from the elongated chambers.

In association with the porpoise gate, a ribbon net is provided and is initially disposed within the seine net along the interior of a section thereof. One end of the ribbon net is connected to one side of the inflatable porpoise gate. The other end of the ribbon net is drawn through the water by a utility boat launched from the fishing vessel to segregate the porpoises from the school of fish. The ribbon net is drawn or set between the positions of the school of fish and the school of porpoises. The end of the net remote from attachment to the seine net at one side of the porpoise gate is then drawn over the porpoise gate at the opposite extremity thereof. This maintains a screen between the interior of the seine net and the porpoise gate and prevents the fish from escaping through the porpoise gate. At the same time, the porpoises are directed over the porpoise gate, which is lowered as the ribbon net is drawn into position.

It is an object of the present invention to provide a means for safely freeing propoises within a seine net, while at the same time still maintaining the integrity of the seine net with respect to fish trapped therein. This is possible because of the speed with which the porpoise gate can be raised and lowered through inflation and deflation of an inflatable chamber. Furthermore, because of the rapidity with which the porpoise releasing technique can be employed the porpoises spend a relatively short time within the seine net. This exposes them to less risk of accidental entanglement in the mesh or webbing of the seine net. Also, speed of deployment of the porpoise gate is enhanced because inflation and deflation of the elongated chamber can be remotely controlled through the use of air hoses from the fishing vessel or an utility boat. Remote manipulation of the porpoise gate is achieved by means of flexible airlines running from the boat to the chamber. These air lines are releasably secured to the elongated chambers by means of quick disconnect couplings.

DESCRIPTION OF THE DRAWINGS

FIG. 1 is a diagrammatical plan view of deployment of a seine net utilizing the porpoise gate and ribbon net for the practice of the invention.

FIG. 2 illustrates the initial movement of the ribbon net to separate porpoises from a school of fish.

FIG. 3 illustrates subsequent progressive movement of the ribbon net to screen the fish from the porpoise gate.

FIG. 4 illustrates the escape of porpoises from the seine net with gate in lowered position.

FIG. 5 is an elevational view depicting the porpoise gate in its buoyant position.

FIG. 12 is a sectional view of a selector switch with the inflatable chamber sealed.

FIG. 13 is a sectional view of the selector switch while evacuating the elongated chambers.

FIG. 14 is a sectional view of the selector switch while inflating the elongated chambers.

DESCRIPTION OF THE METHOD AND EMODIMENT

Figure 6:
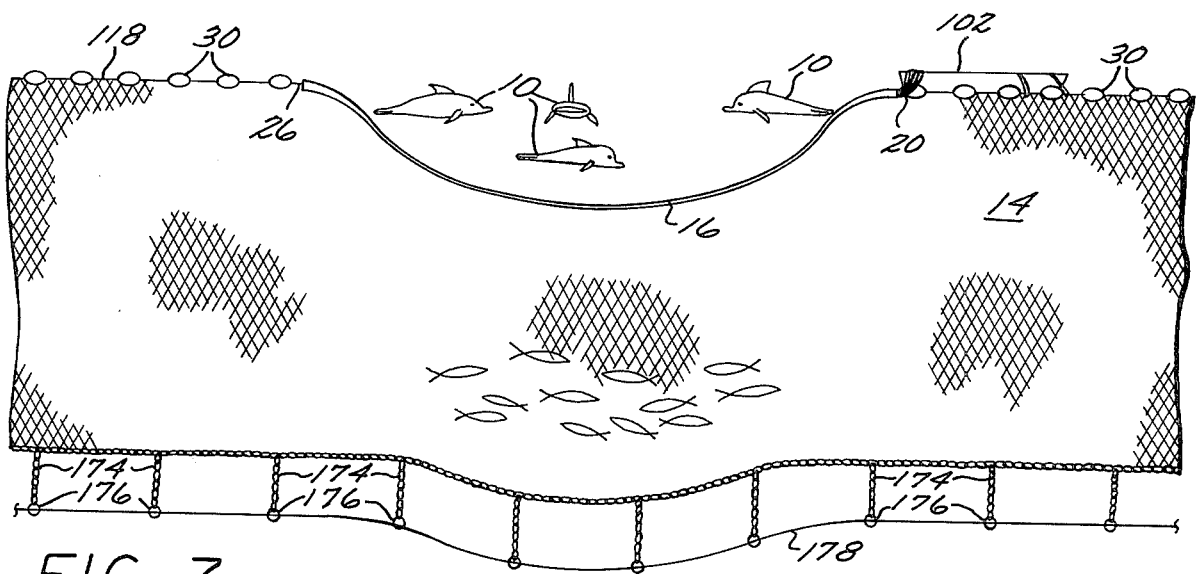
FIG. 6 is an elevation view illustrating the porpoise gate in its submerged condition.

FIGS. 1 through 4 illustrate diagrammatically the steps of freeing sea mammals, such as the porpoises 10 trapped with fish, indicated by the school 12 of tuna in a seine net 14. The seine net 14 is equipped with a sea mammal gate 16, which is selectively buoyant and submersible. As can be seen in FIGS. 2 and 3, the porpoises are encircled with a ribbon net 18 attached at one end 20 to one side of the sea mammal gate 16 and located within the seine net 14 while the gate 16 is in a buoyant condition. An utility boat 22 is used to pull the other end 24 of the ribbon net 18 to the opposite side 26 of the gate 16 as indicated in FIG. 4. The gate 16 is submerged as in FIG. 6, to allow the porpoises 10 to escape while maintaining the tuna 28 within the confines of the seine net 14. The tuna 28 are screened from the submerged gate 16 by the ribbon net 18.

Figure 8:
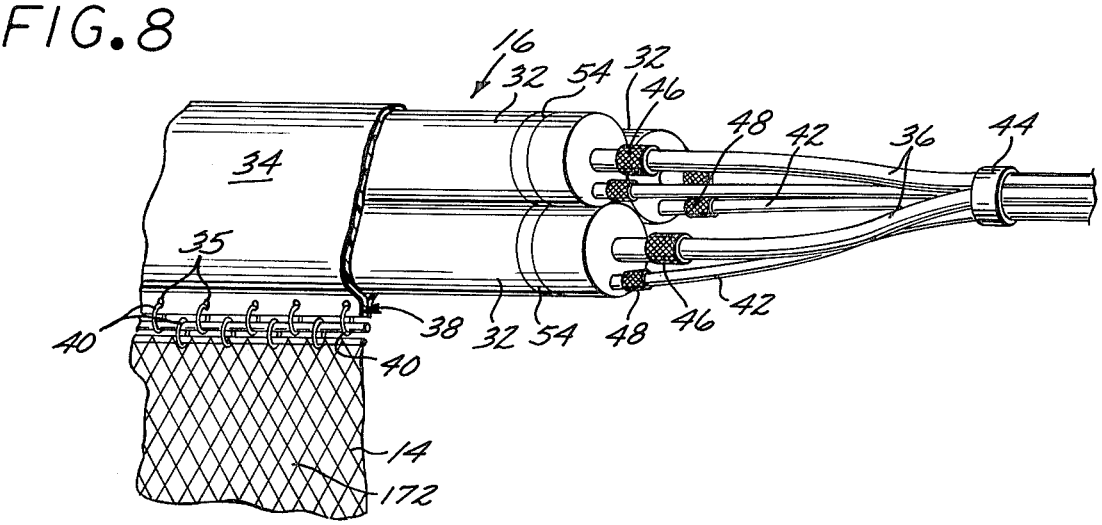
FIG. 8 is a perspective view of one end of the porpoise gate.
Figure 10:
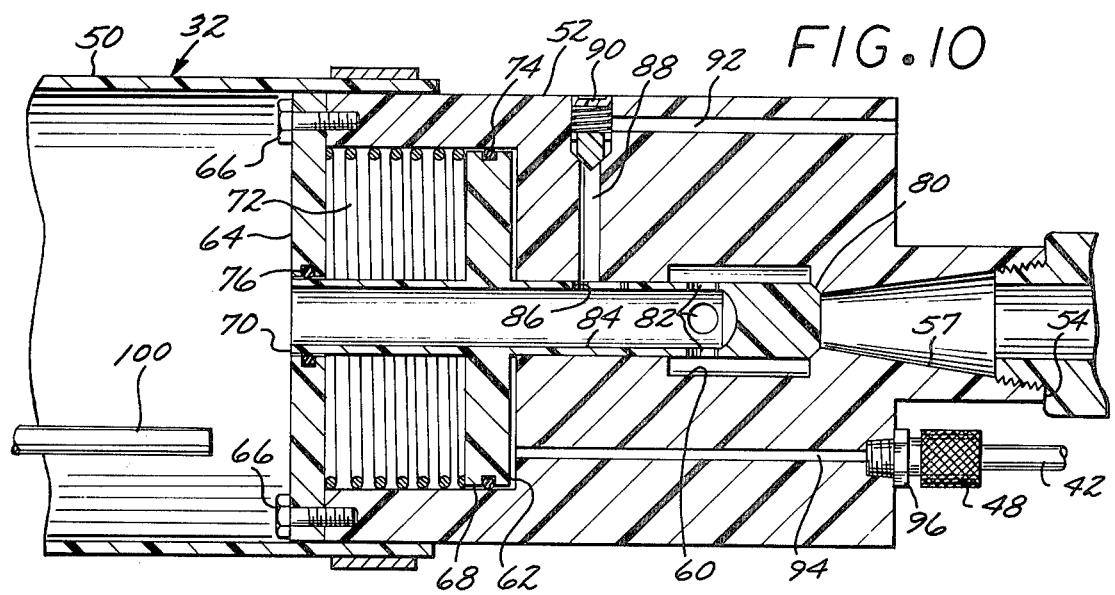
FIG. 10 is an elevational view of one end of the porpoise gate with the main valve sealed.
Figure 11:
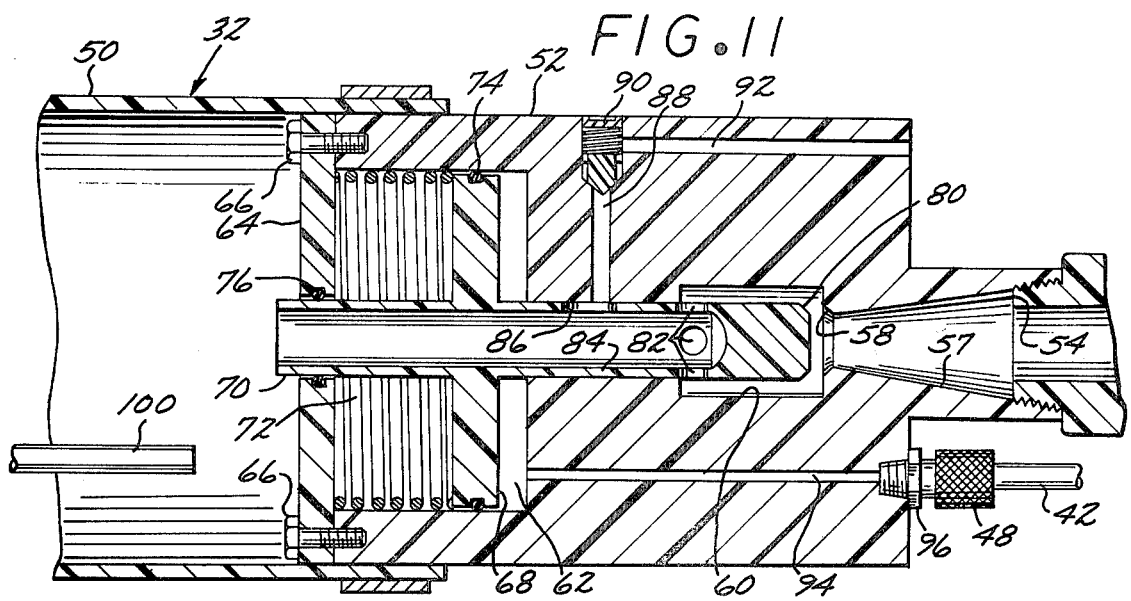
FIG. 11 is a view similar to that of FIG. 10, but with the main valve open.

The structure of the sea mammal gate 16 itself is depicted more clearly in FIGS. 8 thrugh 11. The gate 16 is connected in lieu of the floats 30 of FIGS. 5 and 6 along a portion of the upper edge of the seine net 14. The gate 16 is formed from one or more elongated inflatable chambers 32, of generally cylindrical configuration when inflated, which are arranged in juxtaposition and enveloped with a common sleeve 34 which is attached to the cork line 118, with twine in the same manner conventionally used to attach webbing 172 to the cork line 118. In the illustrated embodiment three such chambers 32 are utilized. A compressed gas line, typically an air hose 36 leads to each of the inflatable chambers 32 for inflation and deflation of the bodies of these chambers, as depicted in FIG. 8. As illustrated in FIGS. 8, 10 and 11, a main valve assembly is interposed between each inflatable chamber 32 and the compressed air hoses 36 for selectively admitting air to and exhausting air from the inflatable chambers 32. This alters the buoyancy characteristics of each inflatable chamber 32.

A protective sleeve 34 encircles the cylindrical chambers 32, which are packed lengthwise together therein, as depicted in FIG. 8, and is constructed of heavy, water insensitive fabric, such as rubber, heavy canvas or nylon. The sleeve 34 includes a lengthwise selvage strip 38 directed downward from the porpoise gate 16. Stainless steel or brass grommets 35 are spaced periodically along the length of the selvage 38 to accomodate standard nylon twine 40 which pass through the grommets 35 and secure a standard nylon cork line rope 118 at the upper extremity of the nylon net webbing of the seine net 14 to the sleeve 34.

The tubular inflatable chambers 32 each terminate in an end to which is connected a main compressed air supply hose 36 and a pilot air supply hose 42. The gas supply lines 36 and 42 are hoses about 15 to 20 feet in length constructed of rubber or polyvinyl chloride and are quite flexible, since it is necessary that they bend to accomodate both pressure and suction with submerging and surfacing movement of the porpoise gate 16. The air hoses 36 are preferably about 1¼ inches in diameter while the pilot air supply hoses are about ¼ inches in diameter. The hoses 36 and 42 are secured together in a harness by a plastic or stainless steel band 44 which encircles the hoses and prevents them from becoming entangled with each other. The ends of the hoses 36 and 42 terminate in quick disconnect pneumatic couplings 46 and 48 respectively which are releasably joined to corresponding nipples protruding from adjacent ends of the inflatable tubes 32.

The construction of each inflatable chamber 32 is depicted in detail in FIGS. 10 and 11. Each chamber 32 includes an elongated hollow flexible walled cylindrical bladder 50. Each bladder 50 has one open end which receives a cylindrical end valve body 52 constructed of stainless steel or rigid plastic. The bladder 50 is secured to the end of the valve body 52 by means of one or more band clamps 54 which encircle the bladder 50 and press it against the walls of the valve body 52 to form an air tight seal. Located at the opposite end of the valve body 52 is an axially extending annular boss 56 which is integrally formed as part of the valve body 52. A conventional quick disconnect nipple is attached to the other end of the boss 56. The passageway in the boss 56 narrows as it leads inwardly toward the bladder 50 and terminates at an opening 58 which leads into a port area 60 defined within the interior structure of the valve body 52. The port area 60 is of a cylindrical configuration with a cylindrical passageway of reduced diameter opposite the opening 58 and directed toward the bladder 50 leading to a pilot valve cylinder head chamber 62 of expanded diameter. The cylinder head chamber 62 is capped at its opposite extremity by a circular end plate 64. The end plate 64 is attached to the valve body 52 by means of longitudinally directed machine screws 66 which are directed into tapped holes spaced about the periphery of the valve body 52.

The main valve assembly at the opening 58 includes a valve seat 80, and displaced therefrom, a disk shaped piston 68 both integrally formed with a reciprical hollow, cylindrical valve stem 70 extending therebetween. A compressed coil spring 72 is disposed about the valve stem 70 to bias the piston 68 away from the end plate 64 and toward the boss 56. O-rings 74 and 76 form sliding seals with the valve body 52 relative to the piston 68 and the valve stem 70 respectively.

The valve stem 70 carries the valve seat 80 at its end remote from the inflatable tube 50. The seat 80 has an inclined surface which seats in the opening 58 at the entrance to the porting area 60 when in the position of FIG. 10. Alternatively, when the valve stem 70 is shifted to the left, as in FIG. 11, the inclined surface of the valve seat 80 and the opening 58 define an annulus through which air can enter from the pneumatic hose 36 in FIG. 8. The valve seat 80 is normally biased to the position of FIG. 10 by the action of the coil spring 72 as it pushes to the right against the piston 68 which acts as a movable plate against which pressure in the cylinder head chamber 62 can act.

The valve seat 80 serves as a closure element, but includes also transverse apertures 82 which allow air from the porting area 60 to enter the interior of the longitudinal passageway 84 defined within the valve stem 70, when the valve seat 80 is in the position of FIG. 11. Also, an elongated laterally directed port 86 is defined in the wall of the valve stem 70 to the left of the sealed porting area 60. A radial passageway 88 in the valve body 52 leads to a pressure relief valve 90 which allows air to pass therethrough into a longitudinally directed passageway 92 when pressure within the bladder 50 exceeds a predetermined limit and when the elongated port 86 is in longitudinal communication with the radial passageway 88. Opposite the longitudinal passageway 92 is another longitudinal passageway 94 which leads from a pneumatic quick disconnect nipple 96 to the pilot valve cylinder head chamber 62.

One or more narrow, hollow relatively rigid walled pressure equalization tubes 100, each open at both of its ends, extend the length of the inflatable chamber 16 within the bladder 50 to allow pressure to pass from end to end therein. This allows pressure to be equalized within the bladder 50 despite any intermediate kinking of the bladder 50 which may occur as the porpoise gate 16 is hauled aboard through a power block.

Figure 9:
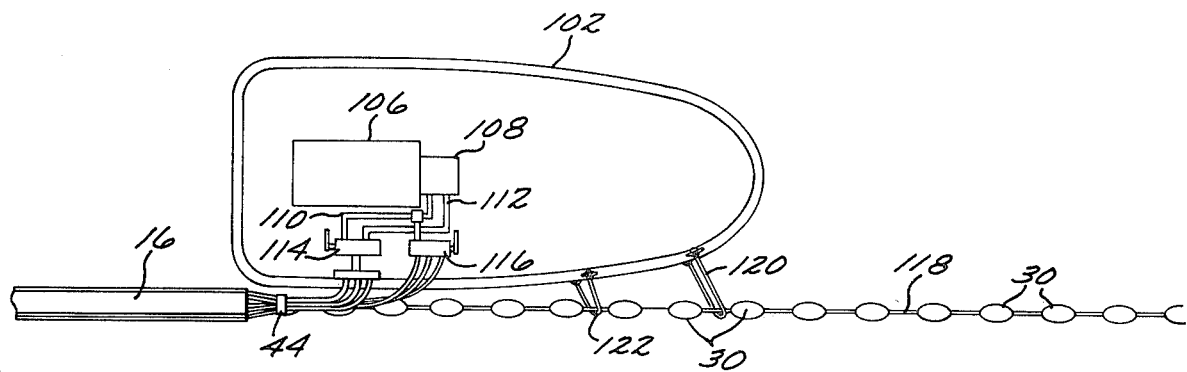
FIG. 9 is a diagrammatic plan view of the utility boat and air compressor connection to the porpoise gate.

FIG. 9 depicts a small utility boat 102 which is normally carried on a fishing vessel 104 (FIGS. 1-4) and which is launched for operation in setting and pursing the seine net 14. The boat 102 is propelled by an engine 106, whcih also has a take off drive for operating an air compressor 108. A pressure line 110 and a vacuum line 112 lead from the air compressor 108 to a selector valve assembly 114. A second identical selector valve 116 is connected only to the pressure line 110, and not to the vacuum line 112.

The utility boat 102 is held in longitudinal alignment along the cork line 118 of the seine net 14 by rope ties 120 and 122 fastened between cork or sponge floats 30. In this way, the utility boat 102 is able to maintain a controlled orientation relative to the cork line 118 and thereby smoothly control submerging and resurfacing of the porpoise gate 16.

The structure of the selector valves 114 and 116 is illustrated in detail in FIGS. 12, 13 and 14. A valve 114 is depicted in different operating positions in each of these drawing figures although it is to be understood that the valve 116 is identical in structure. Each valve 114 and 116 includes a housing block 126 of cylindrical configuration having inlet ports 128, 130 and 132 thereto and outlet ports 134 and 136 therefrom. The housing block 126 has two longitudinal cylindrical bores 125 and 127 extending almost its entire length. The bores are open at one end, but blind at the other, and are offset from the center of the block 126 and in alignment with the block diameter between the inlet ports 128, 130 and 132 and the outlet ports 134 and 136. A pair of valve cylinders 138 and 140 are slidably positioned within the longitudinal bores 125 and 127 respectively in the housing block 126 and move reciprocally together in tandem. The valve cylinders 138 and 140 are rotatably hinged to opposing legs of a T-shaped guide bracket 142. The guide bracket 142 is in turn rotatably hinged by a pivot pin 144 to a control handle 146. An anchoring bar 148 extends longitudinally outward to the left from the housing block 126 and carries an axle 150 which passes transversely through the control handle 146. Movement of the control handle 146 thereby enables the valve cylinders 138 and 140 to move to alternative positions, as depicted in FIGS. 12, 13 and 14. The valve cylinder 138 includes transverse passageways 152 and 154 therein and a channel 156 facing the wall of the housing block 126, all in the plane of the inlet and outlet ports 128, 130 and 132 to the housing block 126. In similar fashion, the valve cylinder 140 includes transverse passageways 158 and 160. Within the structure of the housing block 126 itself, transverse passageways 162 and 164 are defined to extend between the longitudinal bores 125 and 127 which receive the valve cylinders 138 and 140.

Air pressure from the air compressor 108 is provided to the housing block 126 through the pressure line 110. A vacuum line 112 interconnects the selector valve 114, but not the selector valve 116 with the vacuum side of the air compressor 108. The outlet ports 134 and 136 of the selector valves 114 and 116 are interconnected by manifold lines 168 and 170, which in turn are connected to the air pressure holes 36 or the hoses 42. Selector valves 116 are identical in structure to the selector valves 114 and include similar connections with the exception of the vacuum line connection 112. The selector valve 116 has outlet manifold lines connected to the pilot pressure hose 42. By means of the connections depicted, the selector valves 114 are able to supply pressure for inflating the bladder 50 when the valves 114 and 116 are both operated by the control handle 146 to the position depicted in FIG. 14. When the valve 116 is in the position of FIGS. 12 or 13, the main valve of the porpoise gate 16 is sealed, as in FIG. 10. When the valve 114 is in the position of FIG. 13 and the valve 116 is in the position of either FIG. 13 or FIG. 14, a vacuum connection exists to rapidly deflate the bladder 50.

The seine net 14 is of a conventional structure, and is depicted in some detail in FIGS. 5 and 6. The seine net 14 may be almost any length and depth. One possible seine net might be approximately 25 fathoms in length at the surface of the water and about 50 fathoms in depth in the water. At the upper edge of the seine net, sponge plastic floats 30 are spaced periodically at one foot intervals along a cork line 118. The plastic floats 30 are strung on the cork line 118 in a conventional manner. The webbing 172 of the seine net 14 is formed of a series of laterally extending mesh body strips, the lowermost of which is a lead line or chain. From the lead line or chain, ring bridles 174 depend and carry at their extremities purse rings 176, which in turn carry a wire rope purse line 178.

Figure 7:
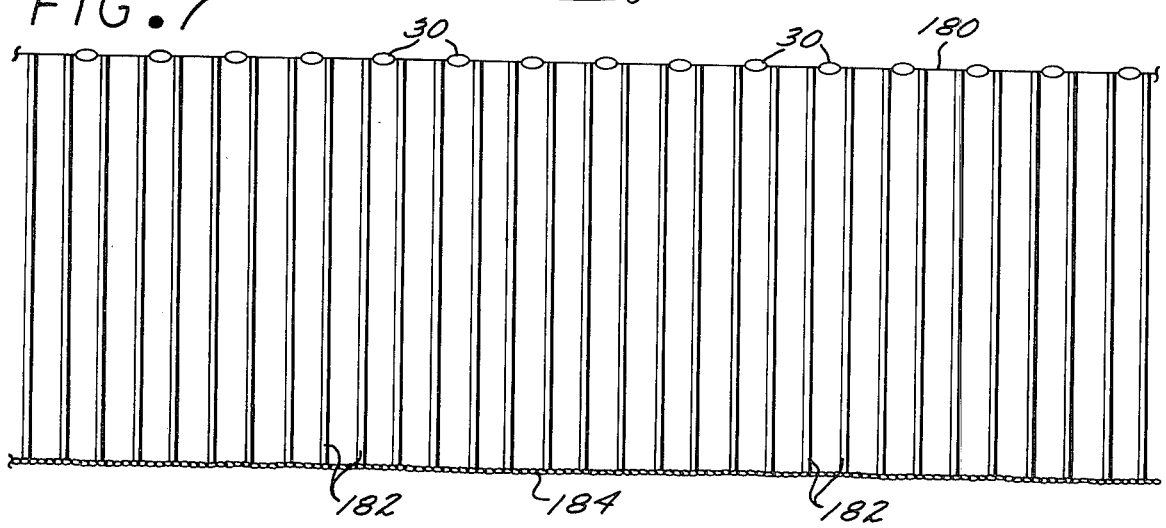
FIG. 7 is an elevational view of the ribbon net used to direct porpoises from the seine net.

The ribbon net utilized in connection with the invention is depicted in detail in FIG. 7. The overall length of the ribbon net 18 is approximately 50 to 100 fathoms and includes a series of plastic floats 30 interconnected along a conventional cork line 180. The ribbons 182 are each 1½ inches wide and are spaced on three to twelve inch centers. The ribbons 182 are constructed of nylon or some other water impervious fabric. The upper ends of the ribbons 182 are looped into sleeves which are fastened about the cork line 180. At the bottom of the ribbon net 18, a longitudinally extending chain 184 provides weight and is fastened to double sewn flaps at the lower extremities of the ribbons 182. The overall depth of the ribbon net 18 is five to twenty fathoms.

According to the technique of the invention, and with reference to FIGS. 1-4, a seine net 14 is first set in position to encircle a school 12 of tuna 28 which have been sighted. Techniques for setting and operating seine nets are disclosed in some detail in an article "Purse Seine Revolution in Tuna Fishing" in the publication Pacific Fisherman, the June, 1961 issue. The seine net 14 is an otherwise conventional seine net with the exception that the porpoise gate 16 is attached along a section thereof in place of the floats 30 at a section of the upper extremity of the net, in the manner depicted in FIG. 8. Also, the ribbon net 18 is initially attached at both of its ends in juxtaposition to the seine net 14, and extending along a section of the interior perimeter thereof. From the fishing boat 104, two utility boats 102 and 22 are launched. The utility boat 22 is moved inside the encircled area of water within the seine net 14, and the fisherman on utility boat 22 unfasten the end 24 of the ribbon net 18 from the seine net 14, and fasten that end 24 to the stern of the utility boat 22. In the meantime the crew of the utility boat 102 maneuvers the boat 102 to the position indicated in FIGS. 1-4. There they fasten the quick disconnect couplings 46 and 48 at the terminal ends of the hoses 36 and 42 to the corresponding nipples protruding from the end plugs 52 of the porpoise gate 16. The connection in this manner is depicted in FIGS. 8-11. As porpoise gate 16 is initially set with the seine net 14, it is inflated so that it draws the webbing 172 of the seine net 14 to the surface of the water, thus completing an encircling vertical barrier to sea life, as depicted in FIG. 5. Once the pneumatic hose connections 46 and 48 are secured, pressure is available from the air compressor 108 of FIG. 9 at a pressure of from 10 to 30 psi above atmospheric. To inflate the chambers 32, the valves 114 and 116 are initially operated with their control handles 146 in the positions of FIG. 14. While the selector valves 114 and 116 are positioned as in FIG. 14, air passes through the pressure line 110, through the aligned passageways 128, 152, 162, 158 and 134 of the selector valves 114 and 116 and into the manifold connection 168 to both the main air hoses 36 and the pilot air hoses 42.

Air under pressure is forced through the pilot pressure hose 42 and into the passageway 94 in the end plug 52 to the cylinder head chamber 62, as depicted in FIG. 11. Pressure within the chamber 62 forces the piston 68 to the left, as illustrated, thereby drawing the valve stem 70 to the left to expose the previously sealed opening to allow air to enter from the air hose 36 through the opening 58 into the sealed pressure chamber 60. Air passes from the sealed pressure chamber 60 through the transverse apertures 82 in the valve stem 70 to the interior cylindrical passageway 84 defined therein. Since the passageway 84 leads to the interior of the bladder 50, the bladder is quickly inflated and carries the porpoise gate 16 to the surface of the water, as depicted in FIG. 5. Once the porpoise gate 16 is in a buoyant condition, the control handles 146 of the selector valves 114 and 116 are returned to the position depicted in FIG. 12. This causes a flow of air to be cycled through the line 110 to the channel 156 in valve cylinder 138, and then to the vacuum line 112 leading back to the vacuum side of the compressor 108. Removal of pressure from the pilot line 42 allows the bias of the spring 72 to force the piston 68 to the right, thus closing the opening 58, as indicated in FIG 10.

While the crews of the utility boats 22 and 102 perform the foregoing tasks, the crew members of the fishing boat 104 close the purse end of the seine net by drawing on the purse line 178 in a conventional manner, and pull the purse rings 176 of the seine net 14 out of the water. An enclosure is thereby completed so that both the tuna 28 and any other entrapped sea life are confined within the bowl shaped enclosure formed by the pursed seine net 14.

The utility boat 22 then begins to motor in an arcuate path as depicted in FIG. 2 about the location 20 where the ribbon net 18 is attached to the seine net 14 adjacent one end of the porpoise gate 16. The utility boat 22 contines to move in the direction indicated in FIG. 3 until it reaches the opposite end 26 of the seine net 14. The path of movement of the utility boat 22 and the timing for movement are governed by the position of the school of porpoises 10, as it is necessary to draw the net between the porpoises 10 and as many of the fish 28 in the school 12 of tuna as is possible. Initial movement of the utility boat 22 is governed largely by the position of the school of porpoises 10, as porpoises tend to explore the perimeter of the their confines, when entrapped in a seine net. When the porpoises 10 are proximate to the porpoise gate 16, as indicated in FIGS. 1 and 2, the utility boat 22 moves as rapidly as possible to isolate them from the school 12 of tuna.

The porpoise gate 16 remains in the condition depicted in FIG. 5 until the utility boat 22 approaches the end 26 of the porpoise gate 16. At this time, it is desirable for the crew of the utility boat 102 to rapidly lower the porpoise gate 16, to allow these animals to escape as indicated in FIG. 6. This is accomplished by shifting the control lever 146 of the selector valve 114 to the position depicted in FIG. 13, while shifting the control lever 146 of the selector valve 116 to the position depicted in FIG. 14. Pressure within the line 42 opens the main valve opening 58 by shifting the valve stem 70 to the left from the positon of FIG. 10 to the position of FIG. 11, in the manner previously described air is then sucked by the vacuum line 112 from the air hose 36 through the manifold line 170 and through the aligned transversed apertures 136, 160, 164, 154 and 132 with the selector valve 114 in the position of FIG. 13. From the pressure hoses 36, air is drawn through the openings at 58, through the transverse apertures 82 and the passageways 84 in the valve stems 70 to evacuate the interior of the bladders 50. This causes the bladders 50 to rapidly collapse and for the porpoise gate 16 to submerge to the position of FIG. 6. The porpoises are then able to escape the seine net 14 as indicated in FIG. 6. The tuna 28 ae discouraged from escaping since they are screened from the porpoise gate 16 by the ribbon net 18, as indicated in FIG. 4. The utility boat 22 then proceeds over the porpoise gate 16 and veers to the left, as indicated in FIG. 4 to pull the ribbon net 18 over the porpoise gate 16 and out of the seine net 14 while the porpoise gate 16 is submerged. Immediately thereafter, the control handle 146 of the selector valve 114 is moved from the position of FIG. 13 back to the position of FIG. 14. This again supplies air to the bladders 50, thereby reinflating each of the inflatable chambers 32. This causes the porpoise gate 16 to rapidly resurface and prevent the escape of the tuna 28.

Since the ribbon net 18 is at this time outside of the siene net 14, it no longer presents any interference to the normal process of taking in the seine net 14, which is performed in a conventional manner.

In drawing the porpoise gate 16 on board through a power block, the elongated inflatable chambers 32 are likely to deflate. However, kinks frequently develop within the bladders 50. Accordingly, the longitudinally extending tubes 100 which are provided within the bladders 50, and which are open at both ends, allow pressure to equalize within the bladders 50. The weight of the porpoise gate 16 and its manipulation distort the configuration of the bladders 50 as the porpoise gate 16 is hauled on board and cause pressure to build within the bladders 50. The pressure relief valves 90 are set so that even although the main opening 58 is closed, as indicated in FIG. 10, air can still pass through the port 86 in the wall of the valve stem 70, and into the passageway 88, through the pressure relief valve 90 and to the atmosphere through the exhaust passageway 92. The pressure relief valve 90 is normally set higher than the pressure of the compressor 108.

While but a single embodiment of the invention has been depicted in the drawings, numerous variations and modifications thereof will become readily apparent to those familiar with seine net fishing techniques. Accordingly, the scope of the application should not be limited to the specific embodiment and implementation described in detail, but rather is defined in the claims appended hereto. For example, while the invention has been presented in the context of liberating porpoises while fishing for tuna, it should be realized that the same technique and devices may be utilized to prevent entrapment of virtually any sea mammal in any commercial fishing operation utilizing a seine or purse net. For example, the invention can be used to prevent injury or death to animals such as sea otters, seals, walruses, as well as other cetaceans, such as killer whales and pilot whales. Also, it should be understood that a vacuum need not be provided to evacuate the chambers 32, as the weight of the net 14 will cause the gate 16 to fall below the surface of the water, whereupon the water pressure will force air out of the bladders 50 when the main valve is open to the atmosphere. A vacuum is desirable, however, to speed the collapse of the chambers 32.

I claim:

1. A sea mammal gate for use with a seine net and connected in lieu of floats along a portion of the upper edge thereof, comprising;
    at least one elongated inflatable chamber;
    a compressed gas line leading to said inflatable chamber; and
    a valve assembly interposed between said inflatable chamber and said compressed gas line for selectively admitting gas to and exhausting gas from said inflatable chamber, thereby altering the bouyancy characteristics of said inflatable chamber including a main valve with a closure element normally biased to seal a valve opening, a pilot gas line control for overcoming the bias of said closure element as desired, and a pressure relief valve normally biased shut to maintain pressure in said inflatable chamber and unsealable to release excessive pressure in said inflatable chamber; and
    a herding net weighted at the bottom and with floats at the top having one free end and one end coupled to said seine net proximate to one end of said elongated inflatible chamber.

2. Apparatus according to claim 1 further comprising separate gas lines connected to said valve opening and to said pilot gas line control at releasable connecting means.

3. Apparatus according to claim 1 further characterized in that said main valve includes a hollow valve stem in open communication with said inflatable chamber and reciprocally mounted and axially aligned relative thereto
    and wherein said closure element has a transverse aperture therein and is mounted at one end of said valve stem and moves within the confines of a sealed pressure chamber in communication with said valve opening, and further comprising a transverse pressure plate mounted externally from said sealed pressure chamber upon said valve stem and normally biased to urge said closure element to seal said valve opening, and a pilot gas supply for overcoming said bias.

4. Apparatus according to claim 3 further characterized in that said valve stem has a lateral port therein located externally from said sealed pressure chamber, and said pressure relief valve is encompassed within a housing surrounding said valve stem and is located for alignment with said lateral port when said valve is moved to seal said valve opening and is sealed from communication therewith when said valve stem is reciprocated to unseal said valve opening.

5. Apparatus according to claim 1 further characterized in that said inflatable chamber is constructed with collapsible walls, and further comprising a narrow hollow pressure equalization tube open at both ends within said inflatable chamber and extending the length thereof.

6. Apparatus according to claim 1 in which a plurality of co-extensive inflatable chambers are arranged in juxtaposition and enveloped within a common sleeve which is attached to said seine net.

7. A sea mammal gate for use with a seine net and connected in lieu of floats along a portion of the upper edge thereof, comprising;
    at least one elongated inflatable chamber;
    a compressed gas line leading to said inflatible chamber;
    a valve assembly interposed between said inflatable chamber and said compressed gas line for selectively admitting gas to exhausting gas from said inflatable chamber, thereby altering the bouyancy characteristics of said inflatable chamber;
    a herding net which is a ribbon net comprised of a plurality of vertically disposed lines connected to each other at only at the top and bottom of the net and which is weighted at the bottom and with floats at the top having one free end and one end coupled to said seine net proximate to said elongated inflatable chamber.

* * * * *